_United States Patent Office_ 2,695,425
Patented Nov. 30, 1954

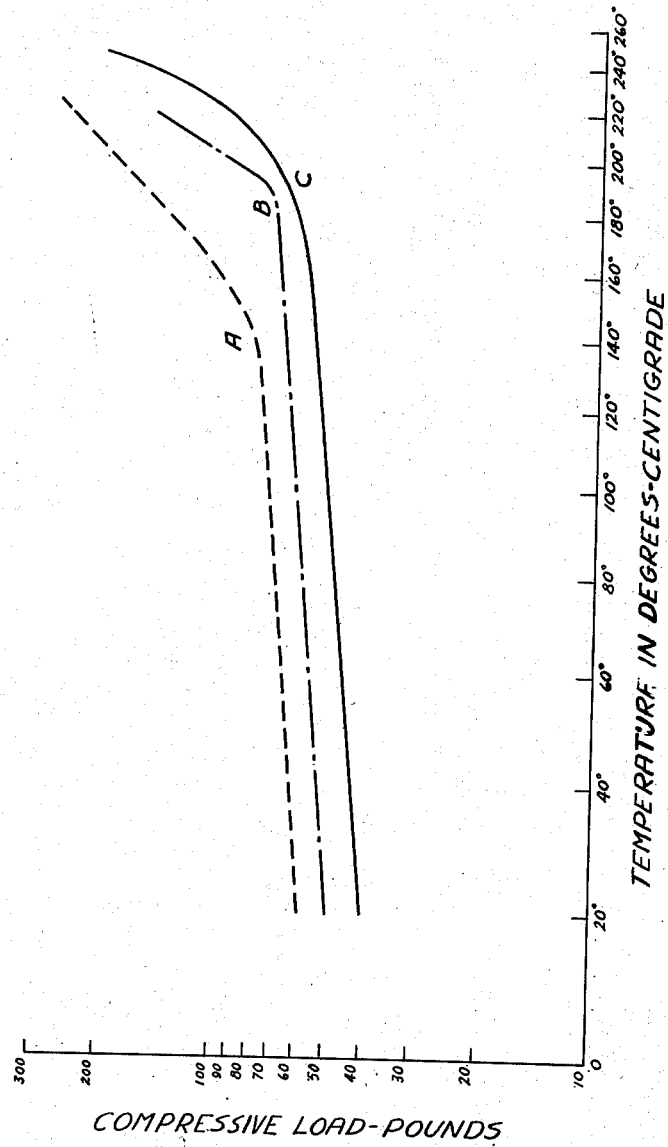

2,695,425

METHOD OF MAKING SINTERED NYLON ARTICLES AND RESULTANT PRODUCT

Louis L. Stott, Reading, Pa., assignor to The Polymer Corporation, Reading, Pa., a corporation of Pennsylvania Application February 23, 1952, Serial No. 272,966

40 Claims. (Cl. 18—47.5)

This invention relates to the art of molding high molecular weight synthetic linear polyamides known as nylon. The synthetic polymeric materials used in the practice of this invention are the synthetic linear polyamides of the general type described in United States Patents 2,071,250, 2,071,253 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above, or as otherwise identified hereafter, can be obtained, for example, by self-polymerization of monoaminomonocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the simple polyamides the average number of carbon atoms separating the amide group is at least two. On hydrolysis with hydrochloric acid the amino acid polymers yield the amino acid hydrochloride, and the diamine-dibasic acid polymers yield the diamine hydrochloride and the dibasic carboxylic acid. For the sake of simplicity, the linear polyamides described above will be referred to herein as nylon.

Although these materials were originally introduced as fibers for use in the textile industry, they have subsequently been made available as raw materials for the molding and extrusion industries. The high melting nylons, such as polyhexamethylene adipamide and polyhexamethylene sebacamide, are characterized by relatively sharp melting points and high fluidity in the molten condition in comparison to other thermoplastic materials such as cellulose acetate and polystyrene. The characteristics have made compression molding of these nylons diffcult. At the present time shaped nylon pieces are prepared commercially, either by machining solid nylon, such as nylon rod, or by melting nylon and forming it by injection molding. Both of these methods require the use of virgin nylon and have other drawbacks. Bearings machined from nylon rod, for instance, are relatively expensive to make and involve much waste. Furthermore, the manufacturing techniques for producing nylon rod, particularly for the larger sizes, sometimes introduce strains which must be removed by conditioning. The injection molding technique requires complicated and expensive apparatus, high cost molds, and also frequently results in a product having many strains. The strains cause bearings prepared by injection molding to seize readily if large clearances are not provided. The presently used molding techniques depend upon heating a polyamide above its melting point and exerting pressure on the molten material. The strains produced in the resultant article come as a consequence of cooling the molten material and, at least in part, are due to a relatively high volumetric shrinkage on solidification.

It is an object of this invention to produce shaped articles of nylon without the use of heat sufficient to melt the nylon. Another object is to prepare shaped nylon articles having considerably less strain than similar conventionally molded articles. Still another object is to produce strong wear resistant nylon shapes with conventional powder metallurgical tools from either virgin or reworked nylon. A further object is to prepare molded nylon articles having improved dimensional stability over wide changes in humidity. A still further object is to produce modified nylon articles with specialized physical or electrical properties. These and other objects which will become apparent hereafter may be accomplished as follows:

The nylon powder must have an ultimate particle size diameter of 40 microns or less and preferably below 25 microns, but the optimum size appears to be 10 micron size or less. Such a powder may be prepared by dissolving either scrap or virgin nylon in a solvent for the nylon at elevated temperatures (and pressures, if necessary) and a non-solvent at room temperature, filtering the solution if necessary, precipitating the nylon by cooling, removing the solvent, and drying the nylon carefully to prevent undue oxidation. The cooling may be advantageously carried out by running cold water into the hot solution. Such a solvent is ethylene glycol and the procedure is fully set forth in U. S. application Ser. No. 202,405 filed December 22, 1950 in the names of Louis L. Stott and Laurence R. B. Hervey, now Patent No. 2,639,278. The powder, and preferably one prepared by precipitation, is compressed to the desired shape, with or without a filler, with sufficient pressure so that it may be handled. The compressed article is thereafter heated to a temperature sufficient to sinter the particles of nylon together without inducing any substantial molten phase. The article may be annealed to remove any residual strains.

The resulting powder is washed with water, and dried at room temperature.

Nylon powder obtained by other methods than precipitation has not proved to be satisfactory. This may be because of the difficulty in obtaining material having an average particle size of less than 40 microns. Polyhexamethylene adipamide powder was obtained by treating nylon with liquid nitrogen to embrittle it, hammering the cold nylon to powder it, and screening the powder to separate the larger particles. The majority of the screened particles had an average diameter of about 50 microns and ranged from 15 to 100 microns in diameter. Attempts to merely grind the nylon did not succeed in obtaining sufficient fine nylon powder for the purposes of this invention. It is also to be recognized that the product obtained by precipitating nylon as described in the above-identified application is very crystalline in character and becomes more so upon sintering as disclosed by X-ray diffraction patterns. I have found that contrary to established procedures for handling thermoplastic materials it is possible to cold press and subsequently sinter finely divided polyamide materials into finished articles using techniques very similar to those applied in powder metallurgy, provided the starting particle sizes are of the order indicated. No precautions need be observed with respect to the type of metals coming in contact with the nylon.

I have also found that various fillers may be added to the nylon powder up to 85% of the total bulk volume while retaining the useful characteristics of nylon, but reducing its sensitivity to humidity and imparting to the finished product characteristics associated with the filler employed.

The fillers that may be added cover a wide range of materials. In general it has been found that for most applications the fillers are advantageously finely divided, although bonding may be secured to larger pieces, if desired. If an abrasive is to be manufactured, abrasive particles are incorporated with the nylon; these include the usual abrasives such as diamond dust, ground silica, carborundum, chalk, alundum, tungsten carbide, etc. For other purposes metal powders, such as copper, lead, or iron, may be added to give the desired properties and these are readily incorporated with the nylon. For still other purposes carbon or graphite particles, or molybdenum disulphide particles, may be incorporated with nylon. In some cases ceramic materials with special dielectric properties are advantageously mixed with nylon. Among these are titanium dioxide and various titanates, in particular combinations of titanium dioxide with alkaline earths. Still another useful filler is nlyon of a higher melting point than that of the sintered material. On occasion polytetrafluoroethylene is a useful filler. The physical and electrical characteristics of molded nylon articles may therefore be tailored to meet the desired specifications where the incorporation of other materials is advantageous. The filler should be substantially non-reactive with nylon, have a higher melting point than the temperature to which the nylon must be raised to sinter it and not subject to any substantial amount of decomposition during the heating step.

In most cases the fillers serve to reduce hygroscopic or thermal expansion as compared to articles made entirely of nylon and aid materially in securing dimensional accuracy through reduced distortion during sintering. The reasons for these improved characteristics are not clear but have been repeatedly observed.

If a filler is to be incorporated with the nylon powder, the filler and nylon, preferably in a well-dried condition, are thoroughly mixed in any convenient manner as by stirring the materials together. The proper nylon powder with or without filler is briquetted, with sufficient pressure to cause the resultant nylon shape to withstand moderate shocks incident to its handling. The pressures employed range generally between about 10 tons per square inch and 50 tons per square inch. The pressures do not seem to be critical, but it has been found that about 25 tons per square inch is a very satisfactory pressure. Pressure in the order of 3 tons per square inch yields a briquette which may be handled only with considerable care and when fired has a compressive strength of about one-half that of a similar piece pressed at 25 tons per square inch. Pressures in excess of 75 tons per square inch are not required. The resultant "cold" preformed article is then sintered by heating it under non-oxidizing conditions to a temperature below the melting point of the nylon present for a time sufficient to cause the article to be strong and hard when cooled. I have found that if several pieces are molded from nylon powder at room temperature and sintered at various temperatures ranging from slightly above room temperature up to nearly the melting point, and the resultant pieces are tested for compression strength, that an interesting phenomenon becomes apparent. Referring now to the drawing, the curves are plots of the loads required to break bearings 1 inch long, ½ inch I. D. and ¾ inch O. D. when the loads are applied along the surface perpendicular to the axis. Curve A is a plot of epsilon-caprolactam polymer sintered at various temperatures; Curve B is a plot of the loads required to break similar bearings of polyhexamethylene sebacamide sintered at various temperatures, and Curve C is a plot of the loads required to break similar bearings of polyhexamethylene adipamide at various temperatures. The bearings were sintered in vacuo.

It will be noted that in the accompanying drawing, the log of the compressive load is plotted against the reciprocal of the temperature in degrees absolute (degrees centigrade + 273°). Since two substantially straight lines result from plotting increasing sintering temperatures for each material, it is apparent that below the inflection point on any curve a single process is operative which is a function solely of an activation energy and the temperature. Above the inflection point a new process is operative with a different activation. It is this second process with which this invention is concerned since sintering below the inflection point is ineffective.

It is not known why the strength suddenly begins to increase at a rapid rate, but the inflection point may be easily determined for any given polyamide. Reference will be made hereafter to the break in the curve as the inflection point. The temperature to which the polyamide should be heated is therefore above the inflection point and below the point where any substantial molten phase occurs. If any substantial amount of molten phase occurs, the article warps, blisters and becomes unusable. As may be observed, the temperature to which hexamethylene adipamide nylon should be sintered is from about 200° C. to about 263° C., hexamethylene sebacamide nylon sintered is from about 190° C. to about 220° C. and epsilon-caprolactam is from about 160° C. to about 215° C.

Before molding the powder it may be granulated, if desired, to obtain freer flowing powder. Granulation is accomplished by tabletting the fine powders at pressures below those used during the molding step and can be carried out with or without a filler. The resultant tablets are ground to pass a 40 to 100 mesh screen and introduced into the mold. Molding is advantageously accomplished by placing the granulated powder in a mold or otherwise compressing it as by passing it through pressure rollers.

After forming, the cold preformed nylon article is then sintered by heating it under non-oxidizing conditions. The time range is usually between 2 to 30 minutes.

The presence of moisture in the nylon powder can, under some conditions, cause cracks to appear in the article on sintering. This is particularly true when the sintering is done in hot oil as contrasted with sintering in vacuo. It has been found that relatively small bearings containing 3% moisture or more before sintering, will crack if immersed directly in hot oil. On the other hand, a similar bearing first immersed in cold oil and then the oil raised slowly to the sintering temperature will be free from cracks. It is therefore preferred to keep the moisture content of the formed nylon article before sintering as low as possible, preferably below about 1% moisture. In the case of large solid objects, the presence of moisture is more critical and a vacuum drying step either on the powder or the preformed article is desirable.

In the above discussion the pressing has been assumed to take place at about room temperature. If the temperature of the mold is raised to a point close to the melting point of the nylon, very unsatisfactory material is produced. A somewhat elevated temperature may be tolerated, however, and such temperature appears to add some strength to the "green" article, but does not materially affect the finished product when sintered. It is essential therefore that the pressing be accomplished at a temperature below that at which any molten phase can occur and preferably at or about room temperature.

The reason for the extremely tight bond obtained by my process is not apparent. It may be, as in the case of finely divided metals, that the high pressure employed, followed by sintering, causes sufficient reorientation analogous to crystal growth to secure adequate bonding. But whatever the reason may be, it is totally unexpected that a strong bond would form, and it is unexpected that any amounts of filler up to 85% of the total bulk volume yield articles of surprising strength.

A further unexpected advantage is secured by my technique in that powder obtained from waste textile nylon, such as stocking material, may be successfully used either alone, or in conjunction with powder obtained from virgin nylon. All attempts to melt and mold or extrude waste nylon have resulted heretofore in excessively brittle products not suitable for commercial use. It is apparent therefore that the high cost factors restricting the wider use of molding nylon shapes have been largely overcome by the process described herein. The special and expensive tools required by the present techniques are replaced by the relatively simple and available cold pressing equipment used in the powder metallurgy art and the relatively expensive virgin nylon may be substituted in whole, or in part, by nylon obtained from nylon scrap and textile waste, such as textile clippings and stockings. The following specific embodiments of my process are described in the following examples in order to clearly illustrate the practice of my invention.

In the following examples the wear resistance of the bearings was accomplished by cementing the bearing or bushing in a brass ring. The assembly was placed in the center of a horizontal shaft supported at either end. A metal strap was placed around the brass casing enclosing the bushing and attached to a weight. The shaft was rotated for a given length of time and the thickness of the bearing was measured before and after the test.

Compression tests on bushings were performed by placing the test piece between two platens of a press and gradually increasing the pressure until the piece failed. Flexural tests on bars were performed by suspending the test bar on knife edges at its ends and applying a force downward at the middle.

*Example 1*

93 grams of waste textile nylon which had been washed to remove dirt and oils was dissolved in 496 ccs. of ethylene glycol in nitrogen atmosphere at 187° C. The solution was filtered to remove foreign fibers and other dirt and cooled. On cooling the nylon precipitated quantitatively from the ethylene glycol as particles having a diameter about one-half micron and a length of about 20 microns. The nylon was washed with water to remove the residual ethylene glycol and vacuum dried at room temperature. A portion of the powdered nylon so prepared was pressed at room temperature at a pressure of 25 tons per square inch to give a rectangular bar approximately 5″ x ½″ x ¼″. The bar was then heated in a vacuum to 263° C. after which it was cooled. A flexural test of the resulting piece required a force of 700 pounds to break it.

*Example 2*

Following the same procedure of Example 1, virgin nylon (polyhexamethylene adipamide) was reduced to small chips, dissolved in ethylene glycol, precipitated and washed. The resultant powder was compressed at the same pressure and temperature into a bar of the same dimensions, and similarly sintered. The test bar required a force of 725 pounds to break it.

*Example 3*

Powdered nylon (hexamethylene adipamide) obtained by the procedure described in Example 1 was pressed at room temperature at 25 tons per square inch to form several bushings ⅝″ I. D., ¾″ O. D. and ¼″ long. The bushings were heated in vacuo to 263° C. When the lengthwise compression strength was tested a load of 2250 pounds was required to break it. A bushing was subjected to a wear test as described above; it was loaded to the extent of 195 pounds per square inch and the surface speed of the shaft was run at 175 feet per minute. After 25 hours the maximum wear in the bushing was .0001 inch.

Bushings of the same dimensions as those described above were prepared by machining a nylon (polyhexamethylene adipamide) rod.

This bushing failed at a load of 2250 pounds, and under identical wear resistance test showed a wear of .0027 inch. The coefficient of friction of the machined nylon bearing was exactly twice that of the molded and sintered bearing. This resulted in the machined bearing operating at a substantially higher temperature.

After completion of the above tests the bearings were washed in a solvent to remove oil and the test was again started. The machined bearings seized after 25 minutes of operation, whereas the molded bearings were still performing satisfactorily without lubricant after 8½ hours.

*Example 4*

Powdered hexamethylene sebacamide was prepared as described in Example 1. A test bar ½″ x ¼″ x 5″ was prepared by cold pressing 25 tons per square inch after which a bar was sintered in vacuo at 216° C. The test piece on cooling was hard and dense and under the flexural testing conditions described previously the strength was found to be 250 pounds.

*Example 5*

Powdered nylon (hexamethylene adipamide) obtained by fracturing nylon cooled with liquid nitrogen was screened to obtain particles having an average diameter of about 50 microns. The particles were compressed at 25 tons per square inch at room temperature, but because the piece was just too weak to be removed from the mold to be sintered no useful article could be obtained.

*Example 6*

A nylon mixture was prepared by mixing nylon powder having diameters of ½ to 20 microns with graphite powder in a mortar and passing the mixture through an eighty-mesh screen. The volumetric percentage of graphite was 61. The nylon was prepared from hexamethylene adipamide nylon textile waste by dissolving the waste after scouring to remove dirt and grease in ethylene glycol, filtering the solution, and precipitating the nylon by the addition of water. The dissolving, filtering and precipitating steps were carried out in a nitrogen atmosphere. The precipitated nylon was thoroughly washed to remove any residual ethylene glycol, and dried. The nylon mixture was briquetted in the form of a bushing 1 inch long with an internal diameter of ½ inch and an external diameter of ¾ inch. The green briquetted piece was sintered by heating it to 258° C. by slowly bringing it to temperature and holding at 258° C. for about 7 minutes in a vacuum. The resulting piece was allowed to cool in vacuum.

Compression tests were carried out in accordance with the above described procedure except that pressure was applied perpendicular to the axis of the bushing and required 187 pounds to cause failure.

*Example 7*

The procedure and materials of Example 6 were followed except that the volumetric percentage of graphite was 78. The compression test was repeated and failure took place under a load of 140 lbs.

*Example 8*

The procedure and materials of Example 6 were followed using copper powder in place of graphite. The volumetric percentage of copper was equal to 81.

The compression test was carried out and failure took place under a load of 184 lbs.

*Example 9*

93 grams of a polymer of epsilon caprolactam was dissolved in 496 ccs. of ethylene glycol at a temperature of from 185 to 190° C. On cooling the nylon precipitated out as a fine powder at about 120° C.; the powder was washed with water and dried at room temperature. A portion of the powder was compressed at 25 tons per square inch to form a bearing which was sintered in a vacuo at about 212° C. The bearing withstood a load up to 221 pounds when subjected to the compression test in accordance with Example 6.

*Example 10*

3.3 grams of polyhexamethylene adipamide was dissolved in a mixture of 16.2 cc. of 200 proof ethanol and 1.8 cc. of distilled water by heating the adipamide in the form of chips under pressure. The washed and dried powder was passed through an 80-mesh screen, compressed in the form of a bearing at 25 tons per square inch and sintered in an oil bath for 30 minutes at 258° C. The resulting oil impregnated bearing was sufficiently strong for light loads.

*Example 11*

A mixture was prepared consisting of 10% by weight of powdered lead and 90% by weight of nylon powder obtained by dissolving and precipitating nylon scrap in ethylene glycol in accordance with the process described above. The mixture was pressed in a mold at 25 tons per square inch to form a bearing 1″ x ¾″ I.D. x ½″ O.D. and vacuum sintered at 260° C. for 15 minutes. By the longitudinal compression test, the bearing withstood a load up to 2500 pounds.

If close tolerances are not required, the pressed, sintered articles may be satisfactorily used without subsequent conditioning or annealing to remove strains which may occur to a minor extent in the molded articles. In some bearings and other articles the necessity for close tolerances requires that the article be free from slight additional shrinkages in service. Annealing is accomplished by simply heating the article, preferably under non-oxidizing conditions, to a temperature under but preferably close, i. e. within 50° C. to the melting point for a few minutes to an hour and slowly cooling. Holding for longer times at lower temperatures also reduces strains. In some cases annealing may be combined with the sintering step to avoid two furnace treatments.

If desired, lubricating agents in minor amounts may be added to facilitate and improve uniformity of the shaped piece and to aid the removal of the pressed piece from the die or for other purposes. Useful lubricants include stearates such as zinc stearate, hydrogenated cotton seed oil, or other greasy or soapy substances which may be either intermixed with the nylon powder or coated on the die surfaces.

As would be expected, increasing quantities of filler tend to increasingly alter the characteristics of the product. As the quantity of abrasive is increased, as for instance diamond dust, to produce a lapping tool, the abrasive action of the diamond dust increases while the polishing action of the nylon becomes less pronounced. A similar effect occurs as the abrasive composition of grinding wheels is altered.

The incorporation of graphite, molybdenum disulphide or relatively soft metals, tends to give the molded article a lubricating quality. Thus molded nylon bushings containing a quantity of lead powder may be operated successfully under light loads for long periods of time without the necessity of oil or other lubrication, other than initial application.

By incorporating iron filings or iron powder or magnetic alloys in finely divided form with nylon, molded articles which are responsive to magnetic and electrical forces may be fabricated. Useful special magnetic materials can also be produced by mixing nylon with compounds of various metal oxides including iron oxide. The technique also can be used to advantage in the construction of various types of resistors, capacitors and brushes.

Where surface porosity is desired, this condition may be readily accomplished by incorporating a soluble material with the nylon powder, and after sintering, leaching out the soluble portion.

In the manufacture of crayons and pencils, difficulty is often encountered in obtaining sufficient crayon or lead strength. I have found that crayon and pencil leads having strength far greater than regular commercial articles may readily be prepared by my method. This may be accomplished by molding nylon, the pigment (or graphite), and a suitable vehicle for the pigment into the desired shape.

One of the important uses for molded nylon has proved to be in the field of bushings and bearings. Polyhexamethylene adipamide in particular has exhibited considerable merit for bushings operating at light loads, especially where normal lubrication is difficult. In many instances these bushings have shown superior wear resistance to similar pieces made from powdered bronze. The bearings made in accordance with my process are fully equal to any nylon bushings made from nylon by any of the present standard techniques and have the advantage of being free from any gross amount of strain. Tests have indicated that the tendency to seize is less than that of injection molded bearings and therefore they may be made to closer tolerances. Other articles which may be advantageously prepared by the process of this invention include various small irregular shapes employed where the wear resistance is an important factor. Such articles as guides used in the textile industry, cams, gears designed for relatively light loads, thrust washers, and in general articles requiring resistance to wear or strength may also be advantageously prepared from nylon powder through my sintering technique.

This application is a continuation-in-part of application Ser. No. 216,845 filed March 21, 1951, in the name of Louis L. Stott and application Ser. No. 227,283 filed May 19, 1951, also filed in the name of Louis L. Stott.

As many apparently widely different embodiments of this invention may be made without departing from the spirit and scope thereof, it is to be understood that I do not limit myself to the specific embodiments thereof except as defined in the appended claims.

I claim:

1. A method of forming a shaped polyamide article which comprises the steps of cold compressing particles of high molecular weight synthetic linear polyamide to a predetermined shape in a mold to form a green article, removing said article from the mold and sintering, said compressing step being carried out at a temperature below that which will induce any molten phase and with sufficient pressure to allow the shaped article to be handled, the ultimate size of said polyamide particles having an average diameter of less than 40 microns, said sintering consisting of heating said shaped article under substantially oxygen free conditions below the temperature where any substantial molten phase is induced and above the temperature where the inflection point occurs.

2. The method of forming a shaped article in accordance with claim 1 wherein the linear polyamide is polyhexamethylene adipamide.

3. The method of forming a shaped article in accordance with claim 1 wherein the linear polyamide is polyhexamethylene sebacamide.

4. The method of forming a shaped article in accordance with claim 1 wherein the linear polyamide is polymeric epsilon -caprolactam.

5. The method of forming a shaped polyamide article which comprises the steps of cold compressing particles of high molecular weight synthetic linear polyamide to a predetermined shape in a mold to form a green article, removing said article from the mold and sintering, said compressing step being carried out at a temperature below that which will induce any molten phase and with sufficient pressure to allow the shaped article to be handled, the finely divided polyamide having an average diameter of less than 40 microns and being obtained by dissolving said polyamide in a solvent for the polyamide at elevated temperatures and a non-solvent at room temperature, precipitating said polyamide to form a fine powder by cooling said solution, removing the solvent from said polyamide and drying said powder, said sintering consisting of heating said shaped article under substantially oxygen free conditions below the temperature where any substantial molten phase is induced and above the temperature where the inflection point occurs.

6. The process in accordance with claim 5 wherein the polyamide powder is obtained by dissolving waste nylon in ethylene glycol to form a solution, filtering said solution, precipitating said nylon by cooling said solution, washing the resulting nylon powder with water, and drying said powder so as to prevent any substantial degree of oxidation.

7. The process in accordance with claim 6 wherein the cooling is accomplished by running water directly into the hot ethylene glycol solution and agitating the solution.

8. The process in accordance with claim 7 wherein the nylon is polyhexamethylene adipamide.

9. A method of forming a shaped polyamide article which comprises the steps of cold compressing particles of high molecular weight synthetic linear polyamide to a predetermined shape in a mold to form a green article, removing said article from the mold and sintering, said compressing step being carried out at a temperature below that which will induce any molten phase and with a pressure of from 10 to 50 tons per square inch to form a predetermined shape, the ultimate size of said particles having an average diameter of less than 40 microns, said sintering consisting of heating said shaped article under substantially oxygen free conditions below the temperature where any substantial molten phase is induced and above the temperature where the inflection point occurs.

10. The method of forming a shaped article in accordance with claim 9 wherein the linear polyamide is polyhexamethylene adipamide.

11. The method of forming a shaped article in accordance with claim 9 wherein the polyamide is polyhexamethylene sebacamide.

12. The method of forming a shaped article in accordance with claim 9 wherein the polyamide is polymeric epsilon -caprolactam.

13. A method of forming a shaped polyamide article which comprises the steps of mixing a filler with finely divided high molecular weight synthetic linear polyamide material, cold compressing the mixture to a predetermined shape in a mold to form a green article, removing said article from the mold and sintering, said compressing step being carried out at a temperature below that which will induce any molten phase and with sufficient pressure to allow the shaped article to be handled, the ultimate size of said polyamide particles having an average diameter of less than 40 microns, said sintering consisting of heating said shaped article under substantially oxygen-free conditions, at a temperature below that at which any substantial molten phase is induced and above the temperature where the inflection point occurs, said filler constituting not more than 85% by volume of the molded structure.

14. The method of forming a shaped article in accordance with claim 13 wherein the linear polyamide is polyhexamethylene adipamide.

15. The method of forming a shaped article in accordance with claim 14 wherein the filler is a finely divided abrasive.

16. The method of forming a shaped article in accordance with claim 13 wherein the filler comprises a stable finely divided solid lubricant at the sintering temperature.

17. The method of forming a shaped article in accordance with claim 16 wherein the lubricant is lead.

18. The method of forming a shaped article in accordance with claim 13 wherein the filler is a finely divided metal characterized by being substantially non-reactive with said polyamide and having a melting point higher than said polyamide.

19. The method of forming a shaped article in accordance with claim 13 wherein the filler is a synthetic linear polyamide having a melting point higher than the non-filler sinterable polyamide.

20. A method of forming a shaped polyamide article which comprises the steps of mixing a filler with finely divided high molecular weight synthetic polyamide material, cold compressing the mixture to a predetermined shape in a mold to form a green article, removing said article from the mold and sintering, said compressing step being carried out at a temperature below that which will induce any molten phase and with sufficient pressure to allow the shaped article to be handled, the finely divided polyamide having an average diameter of less than 40 microns and being prepared by dissolving it in a solvent for the polyamide at elevated temperatures and a non-solvent at room temperature, precipitating the polyamide from solution, freeing the resultant polyamide powder from solvent and drying the polyamide in such a manner as to prevent any substantial oxidation of the powder, said sintering consisting of heating the shaped polyamide article under substantially oxygen-free conditions, at a temperature below that at which any substantial molten phase is induced and above the temperature where the inflection point occurs, said filler constituting not more than 85% by volume of the molded structure.

21. The method of forming a shaped article in accordance with claim 20 wherein the polyamide is prepared by dissolving the polyamide in hot ethylene glycol, forming a powder by precipitating the polyamide, washing the powder free of ethylene glycol, and drying the polyamide.

22. The method in accordance with claim 20 wherein the polyamide is polyhexamethylene adipamide.

23. The method in accordance with claim 20 wherein the polyamide is polyhexamethylene sebacamide.

24. The method in accordance with claim 20 wherein the polyamide is a polymer of epsilon -caprolactam.

25. A strong, shaped polyamide article comprising sintered synthetic linear polyamide particles having an average diameter of less than 40 microns and characterized by being bonded by sintering action alone.

26. A shaped polyamide article comprising sintered synthetic linear polyamide particles having an average diameter of less than 40 microns and said particles having been prepared by dissolving the polyamide in a solvent for the polyamide at an elevated temperature and a non-solvent for the polyamide at room temperature, precipitating the polyamide removing the solvent, and drying the polyamide.

27. The product in accordance with claim 26 wherein the polyamide is polyhexamethylene adipamide.

28. The product in accordance with claim 26 wherein the polyamide is polyhexamethylene sebacamide.

29. The product in accordance with claim 26 wherein the polyamide is polymeric epsilon -caprolactam.

30. A shaped polyamide article comprising sintered synthetic linear polyamide particles having an average diameter of less than 40 microns and a filler constituting not more than 85% of the total bulk density of said article, said article being characterized by being bonded by sintering action alone.

31. The product in accordance with claim 30 wherein the polyamide is polyhexamethylene adipamide.

32. The product in accordance with claim 31 wherein the polyamide is polyhexamethylene sebacamide.

33. The product in accordance with claim 31 wherein the polyamide is polymeric epsilon -caprolactam.

34. A shaped polyamide article comprising sintered synthetic linear polyamide particles having an average diameter of less than 40 microns and a finely divided metallic filler constituting not more than 85% of the total bulk density of said article, said article being characterized by being bonded by sintering action alone.

35. A shaped polyamide article in accordance with claim 34 wherein the metal is lead.

36. A shaped polyamide article in accordance with claim 34 wherein the metal is iron.

37. A shaped polyamide article in accordance with claim 34 wherein the metal is copper.

38. A bearing comprising sintered synthetic linear polyamide particles having an average diameter of less than 40 microns and said bearing being characterized by being bonded by sintering action alone.

39. A shaped polyamide article comprising sintered synthetic linear polyamide particles having an average diameter of less than 40 microns and a finely divided abrasive constituting not more than 85% of the total bulk density of said article, said article being characterized by being bonded by sintering action alone.

40. A shaped polyamide article comprising sintered synthetic linear polyamide particles having an average diameter of less than 40 microns and a finely divided lubricant constituting not more than 85% of the total bulk density of said article, said article being characterized by being bonded by sintering action alone.

References Cited in the file of this patent

UNITED STATES PATENTS

| Number | Name | Date |
|---|---|---|
| 2,193,529 | Coffman | Mar. 12, 1940 |
| 2,372,630 | Smith | Mar. 27, 1945 |
| 2,573,639 | Coler | Oct. 30, 1951 |